Patented Oct. 21, 1952

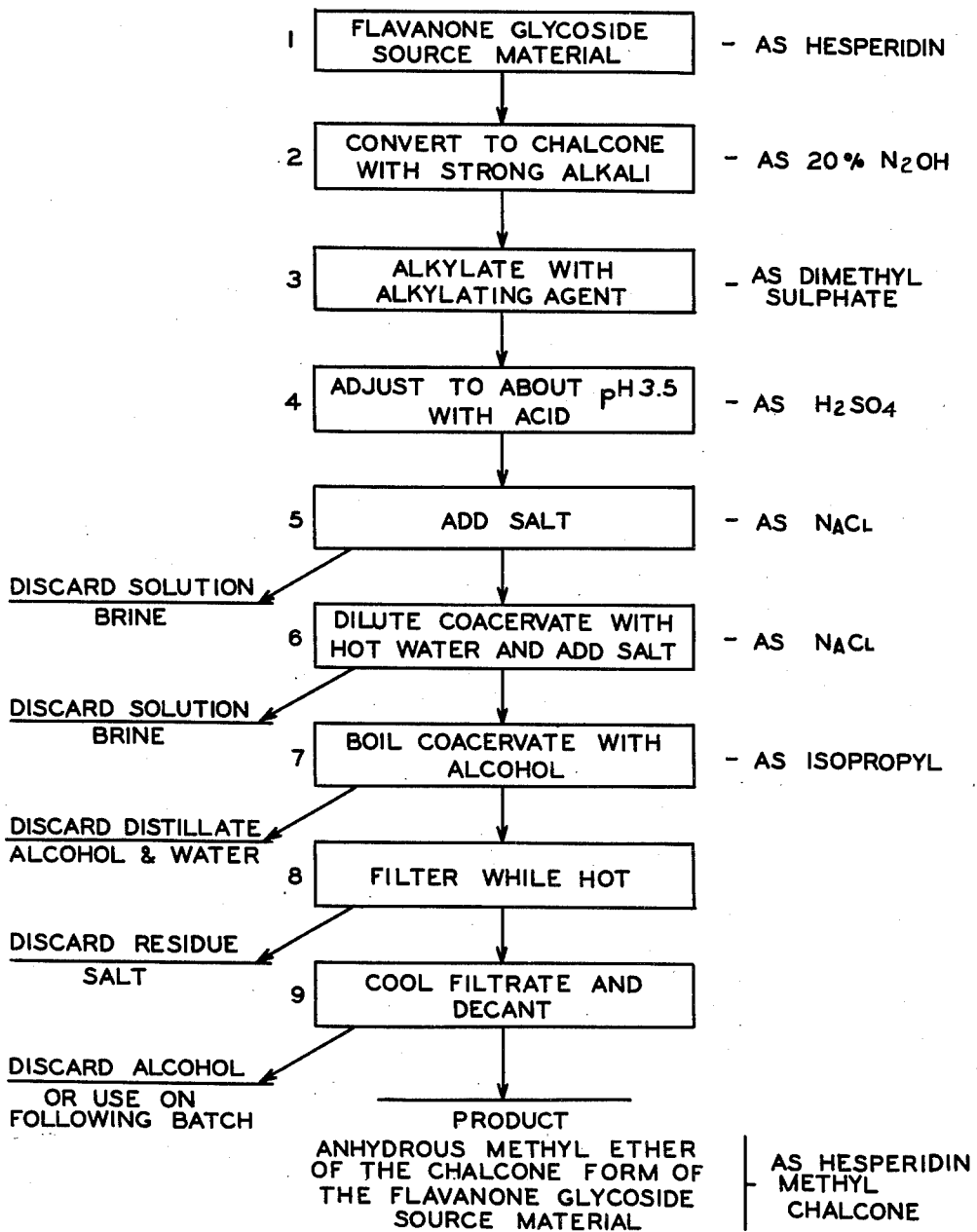

2,615,015

UNITED STATES PATENT OFFICE 2,615,015

METHOD OF PREPARING WATER SOLUBLE ALKOXYL SUBSTITUTED CHALCONE GLYCOSIDES

Clarence Walter Wilson, Ontario, Calif., assignor to Sunkist Growers, Inc., Los Angeles, Calif., a corporation of California Application November 8, 1948, Serial No. 58,836

10 Claims. (Cl. 260—210)

This invention relates to the preparation of water soluble alkyl ethers of the chalcone form of a flavanone glycoside, often referred to as alkoxyl substituted chalcone glycosides, especially those chalcone glycosides derived from the corresponding flavanone glycosides, and more specifically to a method of preparing water soluble methyl ether of the chalcone form of a flavanone glycoside commonly referred to as methylated chalcone glycoside derivatives. Hesperidin chalcone metyl ether is such a material and is hereafter referred to as methylated chalcone of hesperidin or hesperidin methyl chalcone. These materials, and particularly hesperidin methyl chalcone, appear to exhibit a physiological activity reducing or inducing the reduction of capillary fragility and/or capillary permeability. Among other uses, the substance appears to be of particular utility in the treatment of hemorrhagic retinitis.

An object of the present invention is to provide a method for the preparation of water soluble alkoxyl substituted chalcone glycosides derived from the corresponding flavanone glycosides.

A further object of the invention is the provision of a method of producing from flavanone glycosides substances which are acid stable, water soluble, and physiologically active.

A further object of this invention is to provide a method for the preparation of substantially pure, water soluble, alkylated derivatives of the chalcones derived from flavanone glycosides.

A further object of the invention is to provide a method for producing a substantially pure hesperidin methyl chalcone.

A further and more particular object is to provide a method whereby the water soluble, alkoxyl substituted chalcone derivative of a flavanone glycoside, for example, hesperidin methyl chalcone, made by a heretofore known alkoxylating procedure, is rapidly, economically, and efficiently removed and recovered from the reaction mixture with minimum use and loss of reagents; which result is accomplished by a novel and effective salting-out procedure.

Other objects and advantages of my invention may appear upon consideration of the following description and the appended claims.

The drawing is a flow sheet graphically illustrating my preferred process.

I have found that where hesperidin is used as the source material the following procedure will give satisfactory results. The numerals at the beginnings of the paragraphs refer to the numbered steps as shown on the flow sheet.

1. Hesperidin is used as the flavanone glycoside source material. This is a natural glycoside the most prolific source of which appears to be the peel of certain citrus fruits.

2. The hesperidin is suspended in a small quantity of water and agitated under vacuum to deaerate. It is then converted to its chalcone form by adding, while maintaining the vacuum and agitation, a 20% solution of sodium hydroxide, about one mole of sodium hydroxide being added for each one quarter mole of hesperidin.

3. The converted hesperidin (chalcone of hesperidin) is now methylated by adding dimethyl sulfate thereto. This is added slowly while agitating under vacuum in order to prevent oxidation, overheating, and local over-concentration of the dimethyl sulfate. The amount of dimethyl sulfate added may be calculated from the hesperidin content of the starting material. One mole of dimethyl sulfate for each quarter mole of hesperidin has been found to produce a product of satisfactory solubility and stability.

4. The solution, still under vacuum, is now adjusted to about pH 3.5. Sulfuric acid is employed to attain this pH. When the pH is adjusted, the material is more stable and the vacuum may be released without danger of excessive oxidation.

For a more complete discussion of the foregoing procedure, reference may be had to my prior Patent No. 2,425,291, granted August 5, 1947. The present process, down to and including adjusting the pH, is substantially the same as disclosed in my patent. The procedure beyond this point is new.

5. Sufficient dry sodium chloride (rock salt) is now added to nearly saturate the solution, whereupon the hesperidin methyl chalcone will salt out or form a coacervate in the form of a thick, sticky syrup. The solution is maintained at a temperature of about 90° to 100° C. to accelerate coacervation and increase the yield. The brine is then decanted from the coacervate containing the hesperidin methyl chalcone.

6. The hot coacervate of hesperidin methyl chalcone is now diluted or taken up in hot water and the salting out process repeated in the same manner as described above in step 5.

7. Commercial anhydrous isopropyl alcohol is added to the separated coacervate and the resulting solution is boiled or distilled at atmospheric pressure until hydrometer readings of the distillate indicate the absence, or near absence, of water. More alcohol may be added from time to time during this procedure to replace the distillate.

8. The material is now filtered while hot, leaving a residue made up principally of sodium chloride, which is discarded.

9. The filtrate is slowly cooled to a temperature of approximately 0° C. During the cooling the hesperidin methyl chalcone will again form a coacervate or precipitate as a thick syrup, which on cooling down to approximately 0° C. will assume a hard, brittle character. The alcohol may be readily poured from this hardened material.

Numerous variations, modifications and amplifications of the above basic and preferred procedure may be introduced. Some of these will be set out below, along with explanations relative to some of the conditions and manipulations, reference for these purposes being made, by number, to the numbered steps specifically described above.

Step 1

I prefer hesperidin as a source material, although other flavanone glycosides may be subjected to this same procedure, such as naringin, eriodictin, citronin, neohesperidin, sakuranin, and others.

These flavanone materials when converted to their chalcone form by treatment with alkali and during the methylation step are liable to become oxidized. I prefer to prevent oxidation and, accordingly, suspend the starting material in a small quantity of water and agitate under vacuum to deaerate. The material up to and including the step of adjusting the pH is preferably held under vacuum and agitation continued to prevent oxidation and to prevent excessive temperature rises due to the heat generated by the various reactions. It should be understood that, while I prefer to prevent oxidation, my process will function even though some oxidation does take place.

Step 2

The deaerated source material is converted to the corresponding chalcone form by adding thereto a strongly alkaline aqueous solution, such as a 20% sodium hydroxide solution. Solutions of any of the alkali metal hydroxides or alkaline earth hydroxides are suitable. Enough alkali solution should be used to obtain about pH 11.5 to 12.0 and to maintain alkalinity even after the dimethyl sulfate is added. Where hesperidin is used as the source material, I find that about one mole of sodium hydroxide may ordinarily be employed for each one-quarter mole of hesperidin.

Step 3

Other suitable alkylating agents may be employed in place of the dimethyl sulfate indicated. It should be understood that in this procedure, I prefer to end up with water soluble final products. It appears, presently, that this property of water solubility is confined to the partially methylated products. Too high a degree of methylation will reduce water solubility undesirably. Where ethyl groups, for example, are introduced, the water solubility drops very sharply as the proportion of such groups increases. Consequently, I ordinarily confine myself to methylating agents, and I prefer dimethyl sulfate, specifically. During addition of the alkylating agent, agitation is desirably always continued, for the reasons already indicated. For each one-fourth mole of hesperidin, I may use about one mole of dimethyl sulfate and, as already indicated, about one mole of sodium hydroxide. This quantity relationship of the reactants ordinarily provides sufficient alkali to dissolve the hesperidin and to form the chalcone derivative and also provides adequate dimethyl sulfate to effect the desired degree of methylation of the chalcone. It is desirable to maintain a definite alkalinity during methylation as alkalinity is necessary for methylation with dimethyl sulfate and, in order to maintain this condition, small additional quantities of alkali may be added if required. If alkalinity is not maintained during methylation, some of the material may undesirably revert back to form a flavanone glycoside and the desired degree of methylation will not be attained. While the alkali and methylating agent will preferably be added separately, they may be added simultaneously or alternately as desired so long as alkalinity is first established and then maintained during methylation.

Step 4

After a period of time sufficient to allow the desired degree of methylation to take place, the mixture is adjusted to about pH 3.5 by the addition of an acid. The pH range at this point is not critical, except that it must be on the acid side of neutral to obtain efficient salting out of the product as in step 5. It is also desirable to maintain the pH on the acid side of neutral in order to enhance the stability of the product. A range of between about pH 2.0 and about pH 7.0 has been found suitable. Sulfuric acid has been found suitable but other acids may be used, such as hydrochloric acid, for example. In this pH range the mixture is not readily oxidizable and the vacuum may therefore be released.

Step 5

To the material adjusted to about pH 3.5, I have indicated the addition of salt. Any one of a number of water soluble salts are suitable, such as sodium chloride, potassium chloride, sodium sulfate, ammonium sulfate, potassium sulfate, or magnesium sulfate, for example. The particular salt to be used is not regarded by me as being critical, so long as the desired result, which I believe is dependent upon a purely physical phenomenon, is obtained. Many other water soluble, alcohol insoluble salts are also suitable. I have found in practice that sodium chloride is suitable for various reasons, such as cost, availability, ease of handling, and complete lack of toxicity; and this is the salt I prefer.

The selected salt is preferably added dry in order to maintain volume at a minimum, but it may be in the form of brine if desired. When the salt is added, the methylated chalcone (hesperidin methyl chalcone where hesperidin is the source material) will form as a coacervate. Coacervation is aided materially by the application of heat and I, therefore, prefer to heat the solution to about 75° to 100° C. when the salt is added. Although heat is definitely desirable, coacervation will take place without it, but the quantity of methylated chalcone recovered will be smaller. When the methylated chalcone coacervate is separated from the brine solution, the sodium sulfate formed during methylation and other diluents and impurities that are soluble in brine will be largely removed and eliminated.

It should be understood that the coacervate of hesperidin methyl chalcone separated from the brine solution in step 5 may be as usable commercial product, either dried or in its wet state. If the product at this stage is to be utilized without separation of the hesperidin methyl chalcone from the salt, for example, the limitation of alcohol insolubility for the salt selected, as mentioned in step 5, will obviously not be necessary.

Step 6

The methylated chalcone coacervate may now be washed with hot brine and the brine solution discarded. While the brine solution may be made up of water and any suitable salt mentioned above, I prefer to use the same salt employed to effect coacervation, thus preventing any new contamination. In my preferred embodiment, this brine would be sodium chloride brine. The purpose of this further wash is to remove as much sodium methyl sulfate and other brine soluble diluents as possible. In practice, all but a trace of these undesirable constituents are removed. This washing procedure may be omitted, if desired, but a product of lower purity may result.

Instead of washing with hot brine, I may dilute the methylated chalcone coacervate with hot water and saturate with salt, thus reforming a coacervate in the same manner as recited above. This is the procedure I prefer to use and is the procedure set out in step 6 of the preferred example. The salt employed is preferably sodium chloride, although it may be any of the salts mentioned above. It should be noted at this point that the methylated chalcone is practically insoluble in hot brine but is soluble in water. This procedure may be omitted; or it may be repeated several times, depending on the quantity of brine soluble impurities present and upon the purity of the product desired. It has been found in practice that using this procedure once will in most instances remove all but a trace of sodium methyl sulfate and brine soluble diluents.

Either the wash procedure or the diluting procedure will yield a brine solution containing sodium methyl sulfate and brine soluble diluents, which is discarded, and a coacervate containing the methylated chalcone.

Step 6 amounts to a repetition of step 5 for the purpose of further purification and may be omitted or repeated as desired. The product of this step like the product of step 5 may also be a usable commercial product without further treatment.

It is also possible to extract the wet coacervate of either step 5 or 6 with a solvent capable of dissolving hesperidin methyl chalcone in the presence of water. This solvent may then be removed leaving a product which may contain considerable salt. The presence of this salt may not necessarily be objectionable however.

Step 7

The coacervate from step 6 may then be dried by any suitable means, such as by use of a vacuum oven, and then extracted with any solvent for hesperidin methyl chalcone which will not dissolve substantial amounts of the particular salt selected for the salting out operations of steps 5 and 6, such as hot isopropyl alcohol (preferably commercial anhydrous) from which solvent the suspended sodium chloride and any other solvent insoluble diluents may be removed by filtering. I prefer, however, as set out in the description of the preferred embodiment, to boil or distill the coacervate with anhydrous isopropyl alcohol in order to remove substantially all the water. Boiling is continued until hydrometer tests of the distillate show about 98% isopropyl alcohol, indicating that little or no water remains. During boiling, commercial anhydrous isopropyl alcohol is added as required to replace the distillate. The boiling procedure may be carried out at atmospheric pressure. The distillate is discarded, leaving a solution of methylated chalcone in anhydrous isopropyl alcohol and a residue containing salt and other alcohol insoluble diluents. Other suitable anhydrous solvents such as ethyl alcohol, or normal butyl alcohol, for example, may be used, if desired, with little or no change in the resultant product. It will be obvious that other suitable solvents will include any solvent for hesperidin methyl chalcone which forms a minimum constant boiling mixture with water and which will not dissolve substantial amounts of the particular salt selected for the salting out operations of steps 5 and 6 may be used for dehydrating the coacervate by this boiling procedure. Simple routine tests will determine the suitability of any particular solvent. Solvents forming a minimum constant boiling mixture will, of course, be used with an initial water content less than that of the minimum constant boiling mixture. Isopropyl alcohol is selected in view of its efficiency in the process, convenient availability, and ease of removal from the final product.

Step 8

The extract from the drying procedure, or the anhydrous solution of methylated chalcone from the boiling procedure, is next filtered and the residue, mainly salt (sodium chloride where this is the salt employed), is discarded. For greatest yield, the solution must not be allowed to cool during filtration.

Step 9

The filtrate is now cooled, whereupon the methylated chalcone will precipitate in the form of a thick syrupy liquid from which the alcohol or other solvent may be separated as by pouring, siphoning, or decanting. By slowly chilling the filtrate to about 0° C., I find that the precipitate will become hard and brittle. The character of the precipitate varies with the rate of chilling. I prefer to chill slowly, inasmuch as the alcohol may be more readily separated from the precipitate when this procedure is followed. Chilling also lowers the solubility of hesperidin methyl chalcone, thus increasing the yield.

The hard, brittle precipitate contains a small amount of alcohol. In order to remove this alcohol, the precipitate may be subjected to heat and/or vacuum, as by heating in a vacuum oven or subjecting to a current of hot or warm air.

The product derived from my present method is purer than the product resulting from the process disclosed in my above identified patent. The product of my patented method contains relatively large quantities of sodium methyl sulfate, often exceeding 15%, and smaller quantities of other brine soluble materials. A total ash content of not more than .05 to .1% indicates that only a trace of these diluents are present in the product resulting from the method herein disclosed. Sodium methyl sulfate is a diluent that is both toxic and hygroscopic. Because of its toxicity it is obviously undesirable in a product of therapeutic use. The hygroscopic nature of the sodium methyl sulfate reduces the keeping qualities of hesperidin methyl chalcone containing it and constitutes a detrimental factor, particularly where the hesperidin methyl chalcone is to be tableted. My present product, being practically free of sodium methyl sulfate, does not possess the detrimental qualities attributable to this diluent.

I claim:

1. In a method of preparing hesperidin methyl chalcone, the steps of forming a coacervate thereof by adding sodium chloride to an aqueous solution of the hesperidin methyl chalcone having a pH on the acid side of neutral, separating said coacervate from the resulting sodium chloride brine, boiling the coacervate in substantially anhydrous isopropyl alcohol to remove water, cooling to reform a coacervate, and separating the hesperidin methyl chalcone coacervate from the alcohol.

2. The method of recovering hesperidin methyl chalcone from an aqueous solution thereof having a pH on the acid side of neutral comprising, forming a coacervate of hesperidin methyl chalcone by adding sodium chloride to the solution, separating said coacervate from the sodium chloride brine, removing water from the coacervate by boiling in an alcohol which is a solvent for hesperidin methyl chalcone and forms a minimum constant boiling mixture with water and which will not dissolve substantial amounts of sodium chloride, separating the alcohol hesperidin methyl chalcone solution from the alcohol insoluble diluents and recovering the hesperidin methyl chalcone from the solution.

3. In a method of preparing hesperidin methyl chalcone, the steps of forming a coacervate thereof by adding sodium chloride to an aqueous solution of the hesperidin methyl chalcone having a pH on the acid side of neutral, separating said coacervate from the resulting sodium chloride brine, and extracting the hesperidin methyl chalcone therefrom with suitable alcohol in order to separate said chalcone from alcohol insoluble diluents.

4. In a method of preparing hesperidin methyl chalcone, the steps of forming a coacervate thereof by adding a water soluble, salt selected from the group consisting of inorganic sodium, potassium and ammonium salts, and magnesium sulfate to a solution of the hesperidin methyl chalcone having a pH on the acid side of neutral, separating said coacervate from the resulting brine, and recovering the hesperidin methyl chalcone.

5. The method of recovering a water soluble lower alkoxyl substituted chalcone glycoside from an aqueous solution thereof having a pH on the acid side of neutral, comprising forming a coacervate of the alkoxyl substituted chalcone glycoside by adding a water soluble salt selected from the group consisting of inorganic sodium, potassium and ammonium salts, and magnesium sulfate to the solution, and separating said coacervate from the brine.

6. The method of recovering substantially pure hesperidin methyl chalcone from an aqueous solution thereof having a pH on the acid side of neutral, comprising forming a coacervate of hesperidin methyl chalcone by adding sodium chloride to the solution, separating the coacervate from the resulting brine solution, diluting the coacervate with hot water, and again forming a coacervate by adding more sodium chloride, separating the coacervate from the resulting brine solution, boiling the coacervate in a solvent consisting essentially of isopropyl alcohol to remove water, filtering the hot isopropyl alcohol chalcone solution from the sodium chloride and other solvent insoluble residues, cooling the filtrate, and separating the resulting hesperidin methyl chalcone coacervate from the solvent.

7. In a method of preparing hesperidin methyl chalcone the steps of forming a coacervate thereof by adding sodium sulfate to an aqueous solution of the hesperidin methyl chalcone having a pH on the acid side of neutral, separating the coacervate from the resulting sodium sulfate brine, and extracting the hesperidin methyl chalcone therefrom with suitable alcohol in order to separate said chalcone from alcohol insoluble diluents.

8. In a method of preparing hesperidin methyl chalcone the steps of forming a coacervate thereof by adding magnesium sulfate to an aqueous solution of the hesperidin methyl chalcone having a pH on the acid side of neutral, separating the coacervate from the resulting magnesium sulfate brine, and extracting the hesperidin methyl chalcone therefrom with suitable alcohol in order to separate said chalcone from alcohol insoluble diluents.

9. In a method of preparing hesperidin methyl chalcone the steps of forming a coacervate thereof by adding ammonium sulfate to an aqueous solution of the hesperidin methyl chalcone having a pH on the acid side of neutral, separating the coacervate from the resulting ammonium sulfate brine, and extracting the hesperidin methyl chalcone therefrom with suitable alcohol in order to separate said chalcone from alcohol insoluble diluents.

10. In a method of preparing hesperidin methyl chalcone the steps of forming a coacervate thereof by adding potassium sulfate to an aqueous solution of the hesperidin methyl chalcone having a pH on the acid side of neutral, separating the coacervate from the resulting potassium sulfate brine, and extracting the hesperidin methyl chalcone therefrom with suitable alcohol in order to separate said chalcone from alcohol insoluble diluents.

CLARENCE WALTER WILSON.

REFERENCES CITED

The following references are of record in the file of this patent:

UNITED STATES PATENTS

| Number | Name | Date |
|---|---|---|
| 2,425,291 | Wilson | Aug. 5, 1947 |

OTHER REFERENCES

Zemplen et al.: Ber., v. 71 (1938), pages 2511–2520, 10 pages.